US009652286B2

(12) United States Patent
Fan

(10) Patent No.: US 9,652,286 B2
(45) Date of Patent: May 16, 2017

(54) RUNTIME HANDLING OF TASK DEPENDENCIES USING DEPENDENCE GRAPHS

(71) Applicant: Oracle International Corporation, Redwood City, CA (US)

(72) Inventor: Bin Fan, Sunnyvale, CA (US)

(73) Assignee: Oracle International Corporation, Redwood City, CA (US)

( * ) Notice: Subject to any disclaimer, the term of this patent is extended or adjusted under 35 U.S.C. 154(b) by 364 days.

(21) Appl. No.: 14/222,273

(22) Filed: Mar. 21, 2014

(65) Prior Publication Data

US 2015/0268992 A1   Sep. 24, 2015

(51) Int. Cl.
*G06F 9/46*   (2006.01)
*G06F 9/48*   (2006.01)

(52) U.S. Cl.
CPC ...... *G06F 9/4881* (2013.01); *G06F 2209/484* (2013.01)

(58) Field of Classification Search
None
See application file for complete search history.

(56) References Cited

U.S. PATENT DOCUMENTS

| 4,885,684 A * | 12/1989 | Austin ............... G06F 8/30 717/149 |
| 7,467,383 B2 | 12/2008 | Inchingolo et al. |
| 8,423,343 B2 | 4/2013 | Wu et al. |
| 8,453,157 B2 | 5/2013 | Benhase et al. |
| 8,473,901 B1 * | 6/2013 | Johnson ............... G06F 9/44 717/106 |
| 8,578,389 B1 * | 11/2013 | Boucher ............... G06F 9/4436 717/144 |

(Continued)

FOREIGN PATENT DOCUMENTS

| EP | 0753812 | 1/1997 |
| EP | 1770509 | 4/2007 |

(Continued)

OTHER PUBLICATIONS

Azzam Haidar, Hatem Ltaief, Asim Yarkha, and Jack Dongarra, Analysis of Dynamically Scheduled Tile Algorithms for Dense Linear Algebra on Multicore Architectures, 10 Pages.

(Continued)

*Primary Examiner* — Kenneth Tang
(74) *Attorney, Agent, or Firm* — Marsh Fischmann & Breyfole LLP; Daniel J. Sherwinter

(57) ABSTRACT

Embodiments include systems and methods for handling task dependencies in a runtime environment using dependence graphs. For example, a computer-implemented runtime engine includes runtime libraries configured to handle tasks and task dependencies. The task dependencies can be converted into data dependencies. At runtime, as the runtime engine encounters tasks and associated data dependencies, it can add those identified tasks as nodes of a dependence graph, and can add edges between the nodes that correspond to the data dependencies without deadlock. The runtime engine can schedule the tasks for execution according to a topological traversal of the dependence graph in a manner that preserves task dependencies substantially as defined by the source code.

18 Claims, 6 Drawing Sheets

(56) References Cited

U.S. PATENT DOCUMENTS

| | | | |
|---|---|---|---|
| 2002/0138353 A1 | 9/2002 | Schreiber et al. | |
| 2006/0107268 A1* | 5/2006 | Chrabieh | G06F 9/4881 718/100 |
| 2007/0150877 A1* | 6/2007 | Emmett | G06F 9/485 717/149 |
| 2007/0294512 A1* | 12/2007 | Crutchfield | G06F 8/443 712/200 |
| 2008/0148275 A1* | 6/2008 | Krits | G06F 9/542 719/313 |
| 2009/0254774 A1* | 10/2009 | Chamdani | G06F 9/4881 714/2 |
| 2010/0037234 A1 | 2/2010 | Udupa et al. | |
| 2012/0089968 A1* | 4/2012 | Varadarajan | G06F 9/5033 717/136 |
| 2013/0219362 A1 | 8/2013 | Cai et al. | |
| 2014/0130056 A1* | 5/2014 | Goodman | G06F 9/5044 718/104 |
| 2014/0165077 A1* | 6/2014 | Martinez Canedo | G06F 8/451 718/105 |
| 2015/0082314 A1* | 3/2015 | Suzuki | G06F 9/54 718/102 |

FOREIGN PATENT DOCUMENTS

| | | |
|---|---|---|
| WO | 2007149884 | 12/2007 |
| WO | 2010142987 | 12/2010 |

OTHER PUBLICATIONS

OpenMP Architecture Review Board, Version 4.0—Jul. 2013, 320 Pages.

Hai Xiang Lin, Arjan J.C. Van Gemund, and Johan Meijdam, Scalability analysis and parallel execution of unstructured problems, 13 Pages.

Operating Systems, Lecture #12, 4 Pages.

Enno Lubbers and Marco Platzner, Communication and Synchronization in Multithreaded Reconfigurable Computing Systems, In Proceedings of the 8th International Conference on Engineering of Reconfigurable Systems and Algorithms (ERSA), Las Vegas, Jul. 2008, 7 Pages.

* cited by examiner

RUNTIME HANDLING OF TASK DEPENDENCIES USING DEPENDENCE GRAPHS

FIELD

Embodiments of the present invention relate generally to runtime engines, and, more particularly, to runtime handling of task dependencies.

BACKGROUND

The development of software applications typically involves writing software code in a high-level programming language and translating the code into a lower-level machine language that can be executed by a computer system. The programming language itself is generally a set of specifications, such as definitions of acceptable syntaxes, instruction sets, and other features. Exploiting these specifications in a computational environment typically involves implementing additional functionality, such as corresponding compiler and runtime functionality. For example, compiler functions can translate code from high-level "source code" (e.g., human-readable instructions written according to the programming language specifications) into a lower-level "executable code" (e.g., corresponding machine-readable instructions). Once compiled, runtime functions can use runtime libraries, memory locations, etc. to schedule and carry out instructions according to the executable code. Accordingly, implementation of new programming language specifications typically involves development of new compiler and/or runtime functionality for handling such specifications.

New compiler and/or runtime functionality can also be developed to exploit new features of computational systems. Many modern compiler and runtime functions seek to exploit multi-processing execution environments (e.g., computational environments having multi-core, multi-thread processors), for example, by parallelizing computational operations and/or performing other scheduling optimizations. Some programming languages use various groupings of operations (e.g., loops) that can be identified and analyzed by certain compilers to find multi-processing candidates. Other programming languages allow programmers to explicitly define groups of operations into so-called "tasks" that can effectively self-identify to a compiler and/or a runtime function as multi-processing candidates.

Recently, new programming language specifications have begun to support "task dependence," by which conditions of one task are intended by the programmer to depend on conditions of another task. For example, if a programmer intends for Task A to write a value to a memory location and for Task B subsequently to read that value from that location, Task B can be said to depend on Task A (i.e., it is undesirable for Task B to perform its read operation before Task A finishes its write operation). While syntaxes, instructions, and other features relating to task dependence are specified by the programming language, ensuring that code is executed in a manner that preserves task dependencies at runtime can involve overcoming a number of hurdles.

BRIEF SUMMARY

Among other things, systems and methods are described for handling task dependencies in a runtime environment using dependence graphs. Embodiments include a computer-implemented runtime engine that includes runtime libraries configured to handle tasks and task dependencies. In one implementation, the task dependencies are converted into data dependencies. At runtime, the runtime engine encounters tasks defined by executable code, and can identify tasks having associated dependencies. The runtime engine can add those identified tasks as nodes of a dependence graph, and can add edges between the nodes that correspond to the data dependencies without deadlock. For example, the dependence graph can be a direct acyclic graph (DAG) generated at runtime in a manner that avoids "back edges." The runtime engine can schedule the tasks for execution according to a topological traversal of the dependence graph in a manner that preserves task dependencies substantially as defined by the source code.

According to one set of embodiments, a computational runtime environment is provided. The computational runtime environment includes: a processor; a memory having compiled code stored thereon, the compiled code comprising a number of tasks compiled from corresponding task constructs of a source code, at least a subset of the tasks having associated tags that indicate data dependencies reflecting respective task dependencies of the source code; and a scheduler. The scheduler operates to: generate a dependence graph dynamically at runtime according to the subset of tasks of the compiled code and their associated tags; and schedule the subset of tasks for execution by the processor in a manner that preserves the task dependencies of the source code by traversing the dependence graph.

According to another set of embodiments, a method is provided for runtime handling of task dependencies. The method includes: loading a compiled code from a data store, the compiled code comprising a number of tasks compiled from corresponding task constructs of a source code, at least a subset of the tasks having associated tags that indicate data dependencies reflecting respective task dependencies of the source code; generating a dependence graph dynamically at runtime according to the subset of tasks of the compiled code and their associated tags; and scheduling the subset of tasks for execution by a processor in a manner that preserves the task dependencies of the source code by traversing the dependence graph.

According to another set of embodiments, a non-transient, computer-readable storage medium is provided that is in communication with a processor and has instructions stored thereon, which, when executed, cause the processor to perform steps. The steps include: loading a compiled code from a data store, the compiled code comprising a number of tasks compiled from corresponding task constructs of a source code, at least a subset of the tasks having associated tags that indicate data dependencies reflecting respective task dependencies of the source code; generating a dependence graph dynamically at runtime according to the subset of tasks of the compiled code and their associated tags; and scheduling the subset of tasks for execution in a manner that preserves the task dependencies of the source code by traversing the dependence graph.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
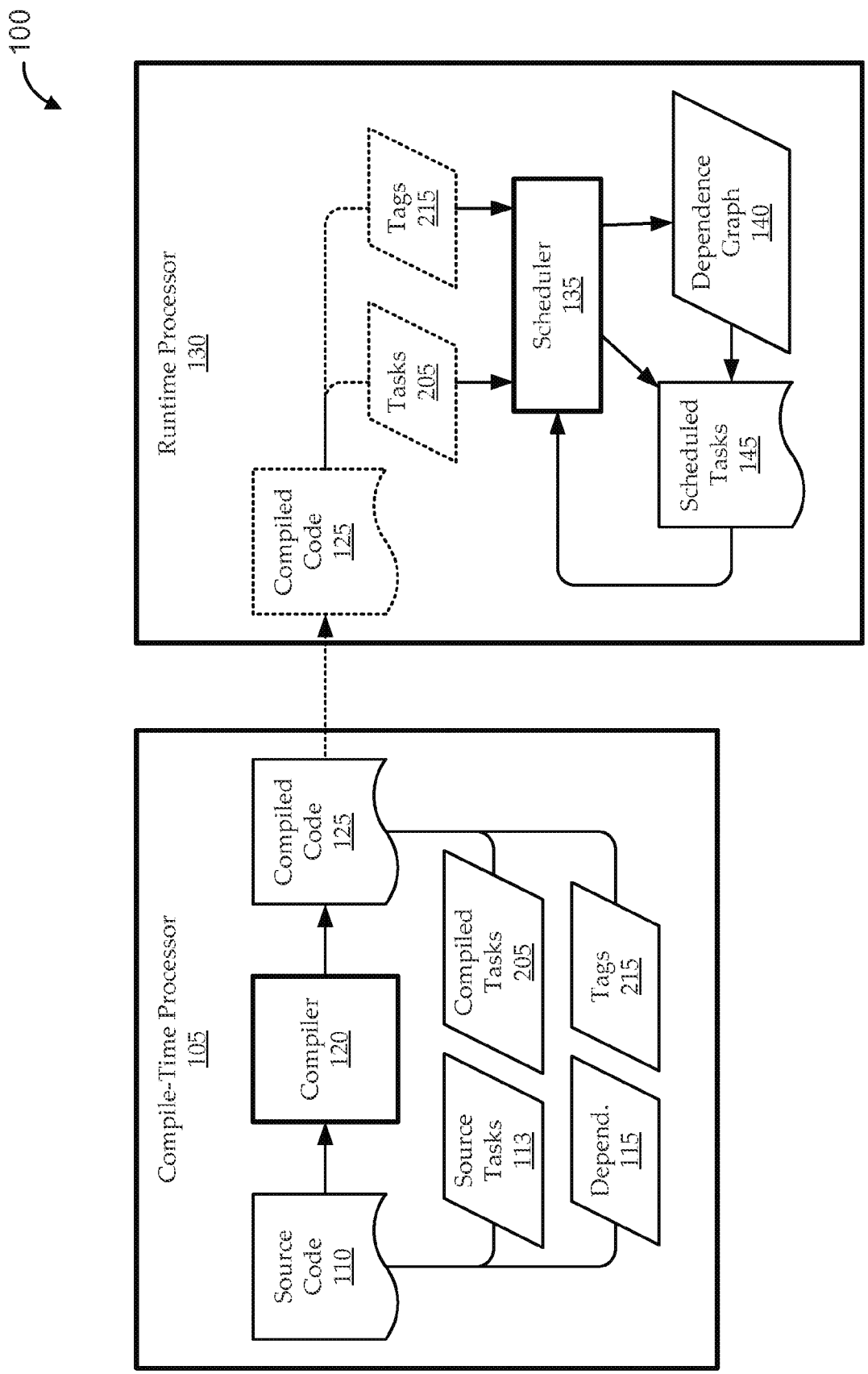
FIG. 1 shows an illustrative code processing environment having a compile-time processor and a runtime processor, according to various embodiments.

Turning to FIG. 1, an illustrative code processing environment 100 is shown having a compile-time processor 105 and a runtime processor 130, according to various embodiments. In one embodiment, the compile-time processor 105 and the runtime processor 130 can be part of a single computational environment (e.g., a single computer). In other embodiments, the compile-time processor 105 and the runtime processor 130 are implemented by different computational environments in one or more locations, at one or more times, etc. For example, an application can be compiled by the compile-time processor 105 in one location at one time, and the compiled application can be executed by the runtime processor 130 in a different location at a later time.

Embodiments of the compile-time processor 105 include a compiler 120 that compiles source code 110 into compiled code 125. For example, the source code 110 is written by a programmer in a human-readable programming language according to specifications of that language, and the compiler 120 includes compile libraries and functions for interpreting that programming language into machine-readable instructions. The compiler 120 can include additional functionality for optimizing the code, for example, to exploit multi-processing capabilities of a target computational environment (i.e., an environment in which the compiled code 125 is expected to be executed).

Embodiments of the runtime processor 130 include a scheduler 135 that schedules the machine-readable instructions of the compiled code 125 at runtime for execution by the runtime processor 130. For example, the compiled code 125 includes a large number of operations in a compiled sequence, and implementations of the scheduler 135 can determine how to allocate those instructions among multiple processors, multiple threads, etc. and/or in what order, according to various optimization schemes and system capabilities of the runtime processor 130. As described more fully below, implementations of the scheduler 135 can schedule operations in a manner that preserves desired task dependencies defined in the source code 110 as implemented in the compiled code 125.

Some implementations of the runtime processor 130 are implemented in multi-processing computational environments (e.g., those with multi-core, multi-thread processors). As such multi-processing environments are becoming more ubiquitous, programmers are desiring more tools for exploiting those multi-processing capabilities. In the past few years, programming languages have begun supporting a new construct, called a "task," as a basic unit of asynchronous execution. For example, by defining a task within a set of code, the programmer can effectively indicate to a compiler and/or runtime engine that the operations of the task are candidates for parallelization or otherwise asynchronous execution. In comparison to traditional techniques, such as parallel loops programming models, task programming models can provide appreciably more flexibility to express concurrent jobs and can improve whole system throughput, for example, when the tasks have irregular workloads. A task programming model can generally include programming language constructs to express code blocks as basic concurrency units, mechanisms to express synchronization and scheduling requirements, and compiler and runtime system support to manage scheduling, execution and synchronization of the tasks. For example, many modern compilers support at least the basic task construct.

In practice, tasks are often not isolated structures. Instead, each task can spawn one or more other tasks, which can, in turn, spawn additional tasks. Accordingly, various hierarchical relationships can occur. For example, when Task A spawns Task B, Task B can be considered a "child task" of Task A. When Task A spawns Tasks B and C, or when neither of Tasks B or C are otherwise ancestors of the other, Tasks B and C can be considered "sibling tasks" of each other. A number of traditional techniques exist for synchronizing hierarchical data structures of different types, but those approaches tend to be deficient in context of task programming models. For example, many such techniques can address scheduling of operations where clear hierarchies are discernible (e.g., when one operation spawns another operation), but not otherwise (e.g., in the case of siblings).

Recently, new programming language specifications have begun to support "task dependence," by which conditions of one task are intended by the programmer to depend on conditions of another task. One such programming language, "OpenMP 4.0," adds memory tags to support the scheduling of sibling tasks. For each task, a programmer can specify a list of memory addresses, each with an associated tag. The OpenMP 4.0 specification describes "IN," "OUT," and "INOUT" tags for task scheduling (only "IN" and "OUT" tags are used herein to avoid overcomplicating the description). Effective, the "IN" tag acts as a read instruction for the associated memory address, and the "OUT" tag acts as a write instruction for the associated memory address. While the description herein refers to OpenMP specifications, including these particular tag designations, the embodiments described herein are intended to apply to other task dependency approaches. While syntaxes, instructions, and other features relating to task dependence are specified by the programming language, ensuring that code is executed in a manner that preserves task dependencies at runtime can involve overcoming a number of hurdles.

For example, it can be cumbersome and potentially error-prone for programmers to keep track of, or even to explicitly define, tasks dependencies. In some implementations, the tags can be generated by the compiler in a manner that corresponds to task dependencies defined in the source code. For example, tag specifications can be used to force Task B to wait for Task A to complete its operations, thereby making Task B depend on Task A. For example, the tags, as implemented by the compiler, can effectively translate task dependencies defined by the source code into data dependencies. Those data dependencies can then be exploited for scheduling by a runtime engine in a manner that preserves desired task dependencies.

For the sake of illustration, suppose in all the following examples that Tasks A and B are sibling tasks sharing at least one memory address (X), the listed tags were generated by an illustrative compiler to support desired dependencies between Tasks A and B, and Task A is encountered first at runtime by an illustrative runtime engine. If Task A includes an "IN(X)" tag, and Task B includes an "IN(X) tag, Tasks A and B can be executed in parallel (e.g., it is not of critical importance which task reads from memory address X first, as no tasks are writing to memory address X in the interim). If Task A includes an "IN(X)" tag, and Task B includes an "OUT(X) tag, it can be assumed that Task B should wait for Task A to finish (e.g., Task A should read the value of memory address X before allowing Task B to write to memory address X). If Task A includes an "OUT(X)" tag, and Task B includes an "IN(X) tag, it can again be assumed that Task B should wait for Task A to finish (e.g., because Task A is encountered first, it should be allowed to write the value of memory address X before allowing Task B to read from memory address X). If Task A includes an "OUT(X)" tag, and Task B includes an "OUT(X) tag, it can yet again be assumed that Task B should wait for Task A to finish (e.g., because Task A is encountered first, it should be allowed to write to memory address X before allowing Task B to write to memory address X).

The above example illustrates various features of such an approach. One such feature, as described above, is that analogizing task dependencies to data dependencies can allow programmers to be concerned only with data flow (i.e., data dependence) among tasks, and task scheduling effectively follows. For example, task scheduling can be dynamically established by the runtime engine according to the memory addresses and tag information provided by the compiler. Another such feature is that the programmer does not have to know (or fully appreciate) the dependence relations between all tasks at programming time, as data flow can dynamically drive the scheduling at runtime. Still, implementing such features, particularly in a fast and reliable manner, can present a number of challenges to compiler and runtime implementers.

Accordingly, embodiments described herein include techniques for handling task dependencies in a runtime environment using dependence graphs. As illustrated, the source code 110 can include one or more source tasks 113 having one or more task dependencies 115 there-between. For example, the source code 110 is written in accordance with the OpenMP 4.0 specificaiton, or the like, and defines a number of tasks 113, at least some of which depend on others. Implementations of the compiler 120 can translate the task 113 constructs defined in the source code 110 in a manner that preserves desired features of the constructs in the compiled code 125 effectively as compiled tasks 205. For example, the compiler 120 can include certain library elements and functions dedicated to identifying and appropriately handling tasks as a basic unit of asynchronous execution in a multi-processing environment. Implementations of the compiler 120 can further translate the task dependencies 115 defined in the source code 110 into appropriate tags 215, for example, as described above. This can effectively translate the task dependencies 115 of the source code into data dependencies preserved in the compiled code 125.

At runtime, the runtime processor 130 receives (e.g., loads to working memory) the compiled code 125, along with its compiled tasks 205 and tags 215. Implementations of the scheduler 135 can include runtime libraries and/or other functions dedicated to appropriate scheduling of the tasks 205 and tags 215. For example, at runtime, the scheduler 135 can encounter tasks 205 defined by executable compiled code 125, and can identify tasks 205 having associated dependencies by their tags 215. The scheduler 135 can add those identified tasks 205 as nodes of a dependence graph 140, and can add edges between the nodes that correspond to the data dependencies (according to the tags 215 and predefined rules) without deadlock. For example, the dependence graph 140 can be a direct acyclic graph (DAG) generated at runtime in a manner that avoids "back edges" (i.e., the DAG can only be traversed in one direction and has no loops). In the DAG, an edge originating at "Node A" and ending at "Node B" can indicate that the task 205 (i.e., the set of instructions associated with that task in the compiled code 125) corresponding to Node B is scheduled to begin execution only after the task 205 corresponding to Node A has completed. According to some implementations, the scheduler 135 can effectively generate a set of scheduled tasks 145 for execution according to a topological traversal of the dependence graph 140 in a manner that preserves task dependencies substantially as defined by the source code 110.

Some embodiments of the runtime processor 130 (e.g., the scheduler 135) interpret the "IN" and "OUT" tags 215 according to a predefined algorithm designed so that the data dependencies indicated by those tags 215 cause operations to be scheduled in a manner that preserves task dependencies that were defined in the source code 110. For the sake of illustration, suppose the runtime processor 130 encounters a set of tasks 205 in the following sequence:

IL(0), O(0), IL(1), O(1), IL(2), O(2), . . . , IL(n), O(n)

It can be assumed that the tasks 205 are sibling tasks that share a common memory location (e.g., each has an "IN" or "OUT" tag 215 that refers to a shared memory location). "IL(i)" represents an i-th list of tasks 205 with "IN" tags. The list can be a set of zero, one, or any number of such tasks 205. "O(i)" represents an i-th task 205 with an "OUT" tag. As each task 205 is encountered, it can be added as a node in the dependence graph 140.

Edges can then be added to the dependence graph 140. According to the above sequence, tasks 205 in the list "IL(0)" apparently depend on no other tasks 205 (i.e., as there is no previously encountered task 205 in the sequence from which it can depend), and the illustrative algorithm can determine not to add any edges to those tasks. Task "O(0)" can determine whether any tasks in list "IL(0)" exist. If so, edges can be added that originate from the existing tasks of list "IL(0)" and terminate into task "O(0)."

In theory, any task "O(i)" (where i>0) can determine its dependencies by determining the existence of any tasks in "IL(0)," "O(0)," . . . , "IL(i−1)," "O(i−1)," and "IL(i)"; and any task in list "IL(i)" (where i>0) can determine its dependencies by determining the existence of any tasks in "O(0)," . . . , "O(i−1)." However, such a determination can be sub-optimal, as it can generate excessive edges. Some implementations exploit a transitive property of task dependence: if task A depends on (i.e., has to wait for) task B, and task B depends on task C, the implication is that task A depends on task C. Accordingly, the above determinations can be optimized. For example, any task "O(i)" (where i>0) can determine its dependencies by determining the existence of any tasks "IL(i)," and edges can be added to the dependence graph 140 from each existing task in "IL(i)" to task "O(i)." If "IL(i)" is empty, and a task "O(i−1)" is determined to exist, an edge can be added from task "O(i−1)" to task "O(i)." Similarly, any task in list "IL(i)" (where i>0) can determine its dependencies by determining the existence of task "O(i−1)." If task "O(i−1)" is determined to exist, an edge can be added from task "O(i−1)" to the tasks in "IL(i)."

While the "IN" and "OUT" tags can be implemented in any suitable manner (e.g., the compiler 120 can use any suitable tag designations, etc.), for the sake of simplicity, the "IN(A)" is described herein as a read operation from a memory location (e.g., a register) identified by "A", and the "OUT(A)" is described herein as a write operation to the memory location identified by "A". Implementations of the runtime processor 130 (e.g., the scheduler 135) are configured to schedule those instructions so that a set (i.e., one or more) of tasks having "IN" tags received sequentially after a task having an "OUT" tag is scheduled to wait for execution until the task having the "OUT" tag has completed, but the set of tasks having "IN" tags can be scheduled as sequential or parallel tasks with respect to each other.

Figure 2:
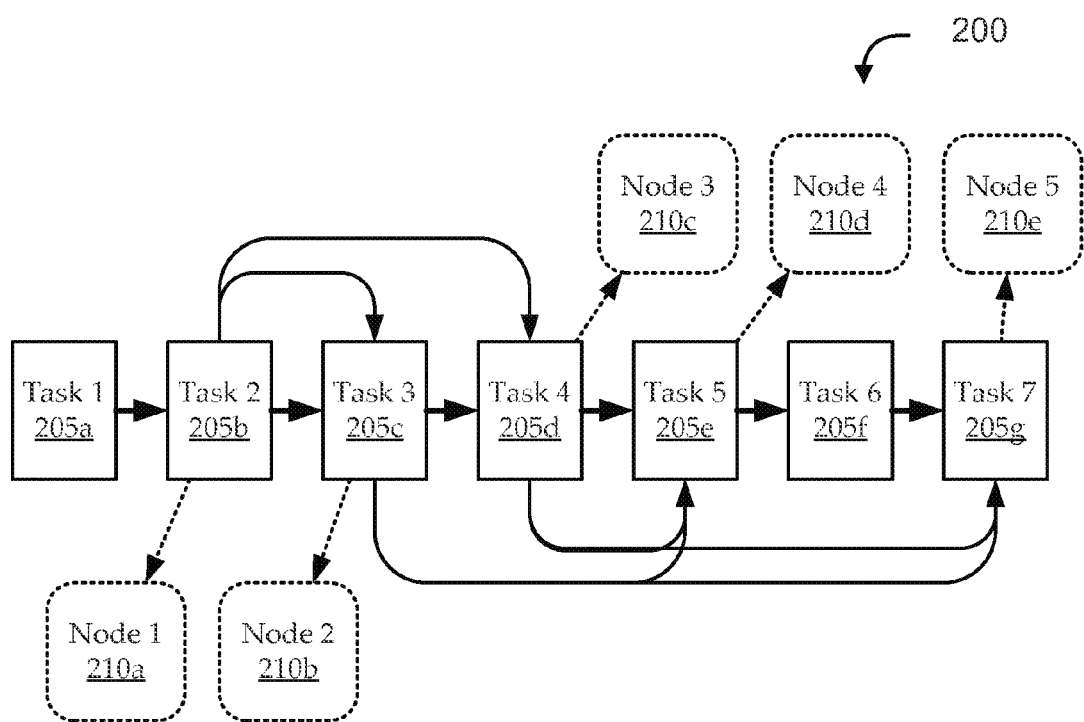
FIG. 2 shows a data flow diagram of an illustrative sequence of seven tasks as encountered by a runtime processor.

FIG. 2 shows a data flow diagram 200 of an illustrative sequence of seven tasks 205 as encountered by a runtime processor 130. The illustrated tasks 205 can be sibling tasks. As illustrated, "Task 1" 205a has no dependencies; "Task 3" 205c and "Task 4" 205d depend on "Task 2" 205b; "Task 5" 205e depends from both "Task 3" 205c and "Task 4" 205d; "Task 6" 205f has no dependencies; and "Task 7" 205g depends from both "Task 3" 205c and "Task 4" 205d. While the runtime processor 130 can schedule all the encountered tasks 205, the description will focus on scheduling of those tasks 205 having dependencies. For example, "Task 1" 205a and "Task 6" 205f can be scheduled in any suitable manner without concern for data dependencies. Regarding those tasks 205 having associated dependencies (e.g., identified by their data tags 215), implementations of the runtime processor 130 can add those identified tasks 205 as nodes of a dependence graph 140. For example, when "Task 2" 205b, "Task 3" 205c, "Task 4" 205d, "Task 5" 205e, and "Task 7" 205g are encountered, the runtime processor 130 can generate "Node 1" 210a, "Node 2" 210b, "Node 3" 210c, "Node 4" 210d, and "Node 5" 210e, correspondingly.

Figure 3A:
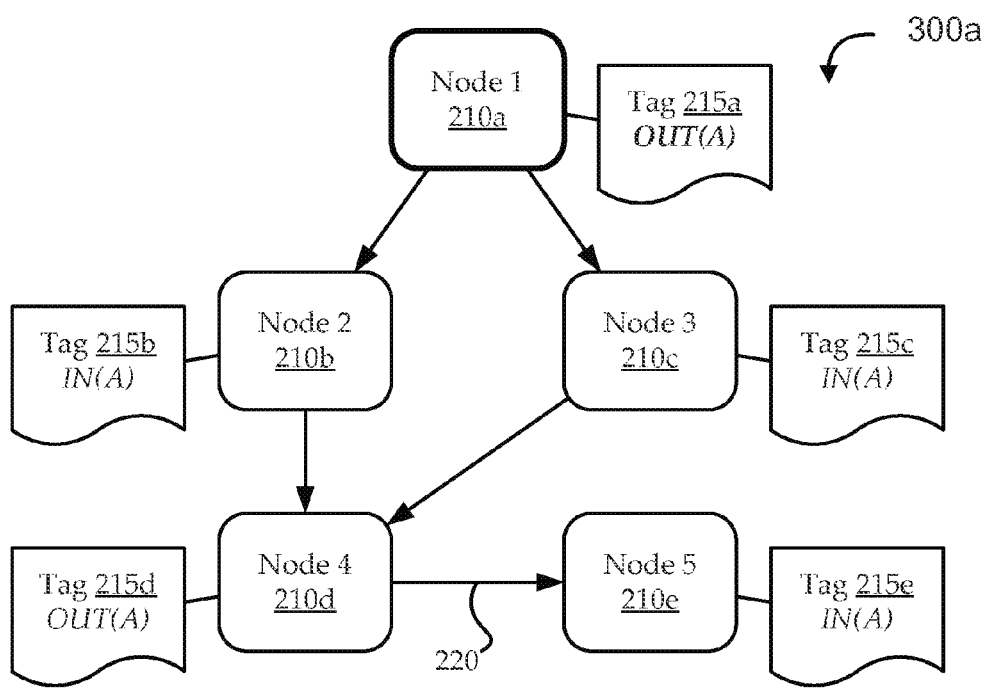
FIGS. 3A-3D show stages of an illustrative direct acyclic graph as traversed by an implementation of a runtime processor, according to various embodiments.

FIGS. 3A-3D show stages of an illustrative direct acyclic graph (DAG) 300 as traversed by an implementation of a runtime processor 130, according to various embodiments. Turning first to FIG. 3A, the DAG 300a is shown as having five nodes 210 generated as described with reference to FIG. 2 above. Between each node 210 is an edge 220 generated in a manner that preserves the desired task dependencies of the source code 110. For example, at compile time, the compiler 120 can interpret a desire for "Task 3" 205c and "Task 4" 205d to depend on "Task 2" 205b by generating an "OUT(A)" tag 215a associated with "Node 1" 210a, an "IN(A)" tag 215b associated with "Node 2" 210b, and an "IN(A)" tag 215c associated with "Node 3" 215c. Similarly, the compiler 120 can interpret a desire for "Task 5" 205e to depend on "Task 3" 205c and "Task 4" 205d by generating an "OUT(A)" tag 215d associated with "Node 4" 210d.

With regard to "Node 5" 210e, some implementations seek to minimize the number of edges entering a node 210. Accordingly, while the source code 110 defines "Task 7" 205g as depending from both "Task 3" 205c and "Task 4" 205d, it can be desirable instead to have "Task 7" 205g effectively depend on "Task 5" 205e, which itself depends from both "Task 3" 205c and "Task 4" 205d. Such an approach provides various features. For example, this can help define a single path for traversing the DAG 300, and can limit (or even eliminate) certain multi-processing issues (e.g., multiple threads trying to write to the same memory location at the same time or in some unpredictable sequence). As shown, the compiler 120 can interpret the desired dependency for "Task 7" 205g (corresponding to "Node 5" 210e) as a dependency from "Node 4" 210d, implemented by generating an "IN(A)" tag 215e associated with "Node 5" 210e.

In terms of the illustrative algorithm described above with reference to FIG. 1, the runtime processor 130 can be said to encounter the set of tasks 205 shown in FIG. 2 in the following sequence:

IL(0) (no tasks; no nodes);
O(0) ("Task 2" 205b; node 210a);
IL(1) ("Task 3" 205c and "Task 4" 205d; node 210b and node 210c);
O(1) ("Task 5" 205e; node 210d);
IL(2) ("Task 7" 205g; node 210e).

For example, task list "IL(0)" is an empty list. Accordingly, task "O(0)" can be determined to have no dependencies, so that no incoming edges are added to its corresponding node 210a. As described above, any task in list "IL(i)" can determine its dependencies by determining the existence of task "O(i−1)," and an edge can be added from task "O(i−1)" to the tasks in "IL(i)" if it exists. Because task "O(0)" exists, an edge can be added from its corresponding node 210a to the nodes corresponding to the tasks in list "IL(1)" (node 210b and node 210c). Further as described above, any task "O(i)" can determine its dependencies by determining the existence of any tasks "IL(i)," and edges can be added accordingly. Because list "IL(1)" is not empty, edges can be added from the nodes corresponding to list "IL(1)" (node 210b and node 210c) to the node 210d that corresponds to task "O(1)." Finally, task "IL(2)" can be treated in the same manner as task "IL(1)." Because task "O(1)" exists, an edge can be added from its corresponding node 210d to the node 210e corresponding to the single task in list "IL(2)."

The above is intended to describe one possible algorithm for generating a dependence graph 140, according to some embodiments. The DAG 300 is generated so that nodes 215 effectively represent tasks 205, edges effectively represent dependencies, and "back edges" are avoided (thereby avoiding cycles or deadlock in traversing the dependence graph 140). Scheduling of the tasks can be accomplished by topologically traversing the DAG 300. For example, execution begins with a node 210 having no incoming edges (i.e., no dependencies). As the instructions of the tasks 205 corresponding to each node 210 are executed, that node 210 is removed from the DAG, along with any edges originating therefrom. Accordingly, tasks are effectively executed in order of their dependencies, and each corresponding task 205 is not invoked in any edges to nodes that will be added to the DAG in the future.

For the sake of illustration, FIGS. 3A-3D demonstrate an embodiment of a traversal of the DAG 300 for scheduling the associated tasks 205. Beginning with the state of the DAG 300a shown in FIG. 3A, an illustrative scheduler 135 can identify node 210*a* as having no incoming edges and can execute the corresponding "Task 2" 205*b*. Having executed "Task 2" 205*b*, node 210*a* and its outgoing edges can be removed from the DAG 300.

Figure 3B:
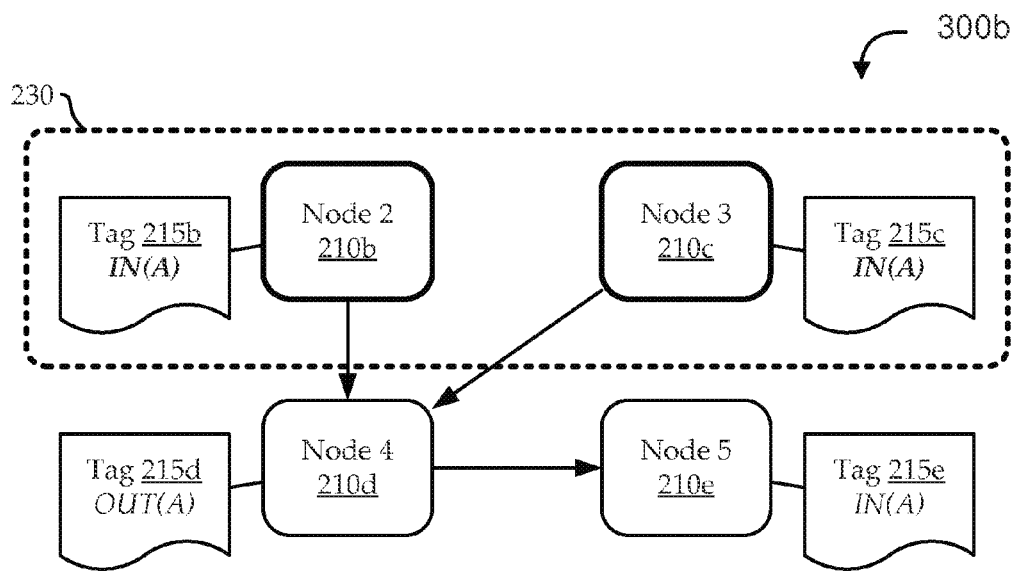

An updated state of the DAG 300*b* with the first node 210*a* removed is shown in FIG. 3B. As illustrated, node 210*b* and node 210*c* both are free of incoming edges, which can indicate that they can now be executed without concern for dependencies (i.e., as the task from which they each depend has already completed execution). The illustrative scheduler 135 can schedule the corresponding tasks ("Task 3" 205*c* and "Task 4" 205*d*) to execute in series or in parallel subsequent to execution of "Task 2" 205*b*, accordingly. For example, "Task 3" 205*c* and "Task 4" 205*d* can be assigned to separate threads and executed in a manner that exploits multi-processing capabilities of the computational environment in which the code is being executed.

Figure 3C:
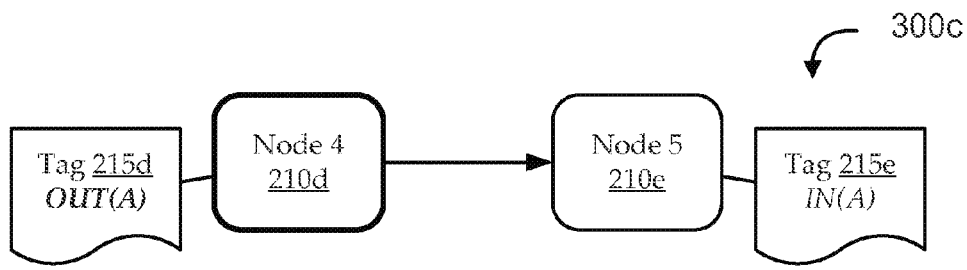

When execution of the tasks corresponding to node 210*b* and node 210*c* is complete, those nodes and their outgoing edges can be removed from the DAG 300. An updated state of the DAG 300*c* with node 210*b* and node 210*c* removed is shown in FIG. 3C. As illustrated, node 210*d* is now free of incoming edges, as the tasks 205 from which it depends have completed execution and those respective dependencies are no longer of concern. The illustrative scheduler 135 can schedule the corresponding "Task 5" 205*e* for execution subsequent to execution of "Task 3" 205*c* and "Task 4" 205*d*, accordingly.

Figure 3D:
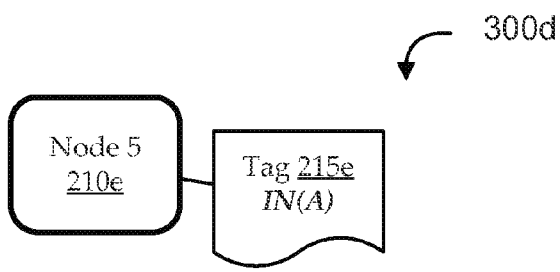

When execution of "Task 5" 205*e* corresponding to node 210*d* is complete, node 210*d* and its outgoing edge can be removed from the DAG 300. An updated state of the DAG 300*d* with node 210*d* removed is shown in FIG. 3D. As illustrated, node 210*e* is now free of incoming edges, as the task 205 from which it depends has completed execution and the respective dependency is no longer of concern. The illustrative scheduler 135 can schedule the corresponding "Task 7" 205*g* for execution subsequent to execution of "Task 5" 205*e*, accordingly.

Some implementations include thread-safe functionality. Each time a node and/or edge is added to and/or removed from a dependence graph 140, the corresponding operation effectively "checks out" the element of the dependence graph 140. For example, each node 210 of a DAG has an associated lock. Before a node is added or removed, an "add" or "remove" operation of the runtime engine 130 acquires the lock, unlocks the node 210 for modification, modifies the node 210 as appropriate, locks the node 210, and relinquishes the lock. This can help ensure that concurrent, conflicting edits cannot be made to the dependence graph.

Figure 4:
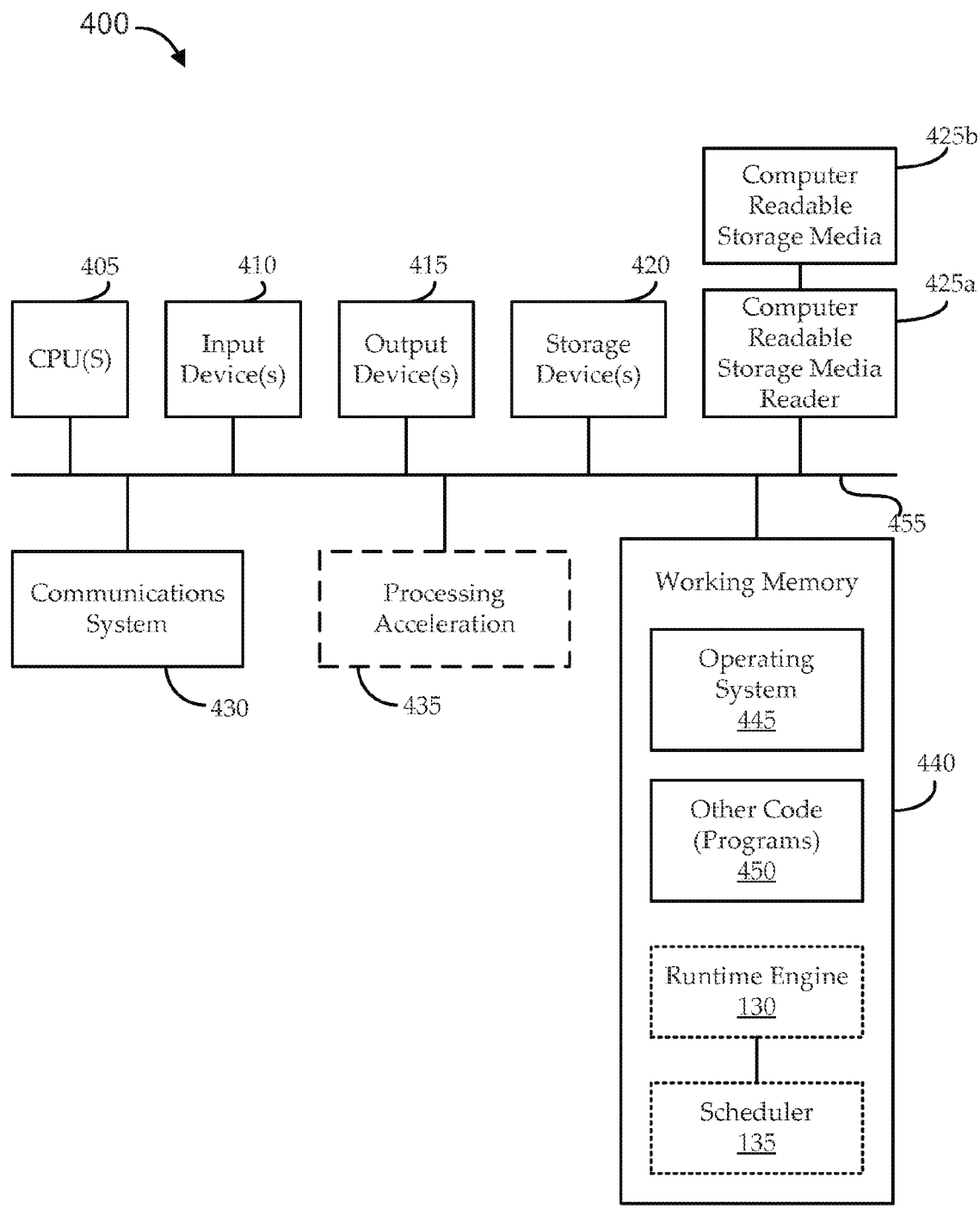
FIG. 4 shows an exemplary computational environment, in the context of which various embodiments can be implemented.

As described above, scheduler 135 functionality can be implemented in a computational environment, such as runtime engine 130 of FIG. 1. FIG. 4 shows an exemplary computational environment 400, in the context of which various embodiments can be implemented. The computational environment 400 can be implemented as or embodied in single or distributed computer systems, or in any other useful way. As described above, the computational environment 400 can me a multi-processing computational environment, for example, including multiple processors, multiple threads, and/or other multi-processing capabilities.

The computational environment 400 is shown including hardware elements that can be electrically coupled via a bus 455. The hardware elements can include one or more central processing units (CPUs) 405, one or more input devices 410 (e.g., a mouse, a keyboard, etc.), and one or more output devices 415 (e.g., a display device, a printer, etc.). The computational environment 400 may also include one or more storage devices 420. By way of example, storage device(s) 420 may be disk drives, optical storage devices, solid-state storage device such as a random access memory (RAM) and/or a read-only memory (ROM), which can be programmable, flash-updateable and/or the like.

The computational environment 400 may additionally include a computer-readable storage media reader 425*a*, a communications system 430 (e.g., a modem, a network card (wireless or wired), an infra-red communication device, etc.), and working memory 440, which may include RAM and ROM devices as described above. In some embodiments, the computational environment 400 may also include a processing acceleration unit 435, which can include a DSP, a special-purpose processor and/or the like.

The computer-readable storage media reader 425*a* can further be connected to a computer-readable storage medium 425*b*, together (and, optionally, in combination with storage device(s) 420) comprehensively representing remote, local, fixed, and/or removable storage devices plus storage media for temporarily and/or more permanently containing computer-readable information. The communications system 430 may permit data to be exchanged with a network and/or any other computer described above with respect to the computational environment 400.

The computational environment 400 may also include software elements, shown as being currently located within a working memory 440, including an operating system 445 and/or other code 450, such as an application program (which may be a client application, web browser, mid-tier application, RDBMS, etc.). As described above, embodiments of the runtime environment 130, including a scheduler 135, can execute compiled code 125, generate dependence graphs 140 and scheduled tasks 145, and/or perform other functionality in working memory 440. For example, source code 110 may typically be written by a programmer designer in a high-level language and can include tasks 113 and dependencies 115 defined according to a specification, such as OpenMP 4.0. A computer-implemented compiler 120 (e.g., implemented on the same or a similar computational environment to the one illustrated in FIG. 4) can compile the tasks 113 and dependencies 115 into tasks 205 and tags 215 in compiled code 125. The compiled code 125 can then be executed in the computational environment 400. As described above, the compiler 120 can generate the tags 215 in a manner that causes task dependencies to be reflected as data dependencies. For example, the tags 215 can indicate use by sibling tasks of a same memory location (e.g., a memory location in working memory 440). These dependencies can be interpreted by the scheduler 135 for scheduling tasks for execution.

It should be appreciated that alternate embodiments of a computational environment 400 may have numerous variations from that described above. For example, customized hardware might also be used and/or particular elements might be implemented in hardware, software (including portable software, such as applets), or both. Further, connection to other computing devices such as network input/output devices may be employed. Software of the computational environment 400 may include code 450 for implementing embodiments of the present invention as described herein.

It will be appreciated that various systems, including the systems described above in FIGS. 1 and 4, can be used to implement embodiments of the unbreakable compile mode techniques described herein. Some embodiments are further described according to various methods. Where the methods are described in the context of specific system components, those descriptions are intended only for the sake of clarity and should not be construed as limiting the scope of any embodiments.

Figure 5:
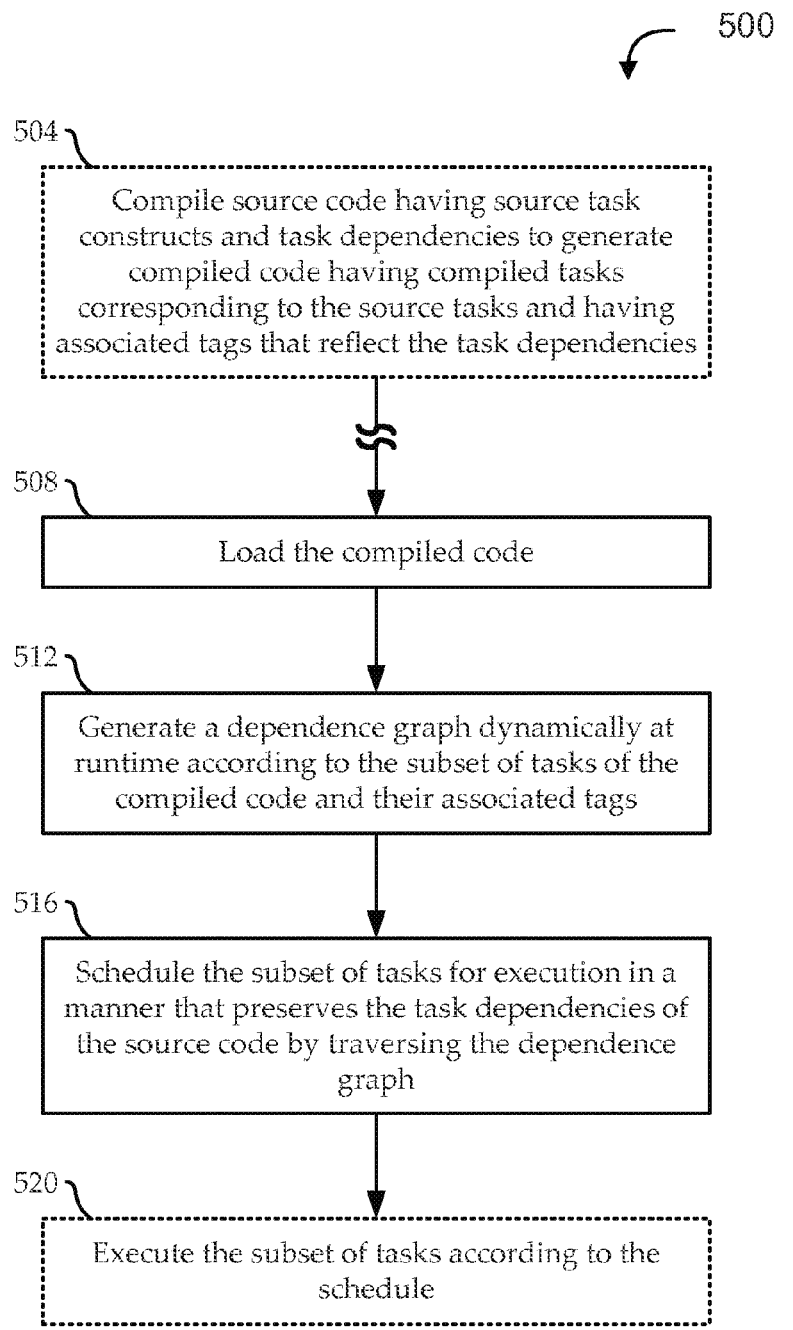
FIG. 5 shows a flow diagram of an illustrative method for runtime handling of task dependencies, according to various embodiments.

Turning to FIG. 5, a flow diagram is shown of an illustrative method 500 for runtime handling of task dependencies, according to various embodiments. For the sake of context, the method 500 is shown beginning at a compile stage. At stage 504, embodiments can compile source code having source task constructs and task dependencies to generate compiled code having compiled tasks corresponding to the source tasks and having associated tags that reflect the task dependencies. For example, the source code is written in accordance with a programming specification, such as OpenMP 4.0, that supports tasks and task dependencies. As described above, the tasks defined in the source code can be compiled into tasks in the compiled code, and the task dependencies defined in the source code can be translated into data dependencies using tags in the compiled code. In some implementations, the tags correspond to read/write operations involving one or more memory locations. For example, the compiler can use an "IN(x)" tag to represent an operation that reads from a memory location identified by "x," and the compiler can use an "OUT(x)" tag to represent an operation that writes to a memory location identified by "x." Such tags can be interpreted to yield data dependencies.

Embodiments of the method 500 can proceed at some subsequent time to execute the compiled code. At stage 508, the compiled code can be loaded (e.g., from working memory or any suitable data store). At stage 512, a dependence graph can be dynamically generated at runtime according to the subset of tasks of the compiled code and their associated tags. At stage 516, the subset of tasks can be scheduled for execution in a manner that preserves the task dependencies of the source code by traversing the dependence graph. For example, the runtime environment can include multi-processing (e.g., multi-core and/or multi-thread) capabilities, and the tasks can be scheduled to exploit those capabilities.

Figure 6:
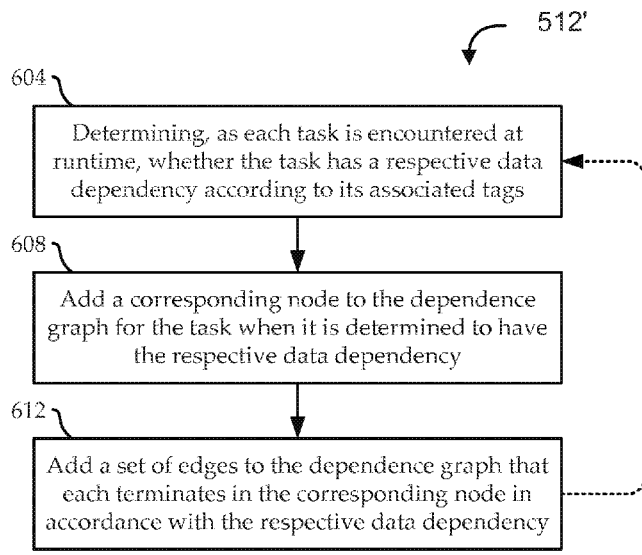
FIG. 6 shows a flow diagram of an illustrative method for dynamically generating a dependence graph at runtime.

For the sake of added clarity, FIG. 6 shows a flow diagram of an illustrative method 508' for dynamically generating a dependence graph at runtime, according to various embodiments. The method 508' can be an implementation of stage 508 of FIG. 5. The illustrative method 508' begins at stage 604 by determining, as each task is encountered at runtime, whether the task has a respective data dependency according to its associated tags. The method 508' can iterate for each encountered task through the entirety of the compiled code, or otherwise as appropriate. For example, as described above with reference to FIG. 2, the compiler can encounter tasks in a sequence, and can interpret task dependencies as data dependencies. The compiler can assign tags to the tasks in the compiled code that indicate those data dependencies in a manner that can be appropriately interpreted at runtime by the runtime environment. For example, those tasks having dependencies can be compiled to have "IN" tags, "OUT" tags, or any other suitable tags that indicates a data dependency to the runtime environment.

At stage 608, a corresponding node can be added to the dependence graph for the task when it is determined to have the respective data dependency. At stage 612, a set of edges can be added to the dependence graph that each terminate in the corresponding node in accordance with the respective data dependency. For example, a direct acyclic graph (DAG) can be used to implement the dependence graph, and nodes and edges can be added to the DAG in a manner that avoids back edges. One example of such a DAG is shown in FIG. 3A above. As described above, some implementations require that an operation (e.g., via a thread, etc.) obtains a lock or the like associated with a node before that node can be added, which can help ensure thread-safe operation of the method 508'.

In one illustrative implementation of the method 508', a scheduler operates to generate the dependence graph dynamically at runtime according to a sequence: IL(0); O(0); . . . IL(n); O(n), where "IL(i)" represents an i-th list of tasks having associated tags corresponding to the operation that reads from the designated memory location of the memory ("i" represents an integer between 0 and n), and "O(i)" represents an i-th task having an associated tag corresponding to an operation that writes to the designated memory location of the memory. As each task is encountered in such a sequence, the dependence graph can be generated by iterating through stages 608 and 612.

For example, when IL(0) is encountered at runtime, a determination can be made as to whether IL(0) is an empty list. If IL(0) is not an empty list, a first set of nodes can be added to the dependence graph corresponding to each task of IL(0). A second node can be added to the dependence graph corresponding to the task of O(0) when O(0) is encountered at runtime. An edge can then be added originating from each of the first set of nodes (each task of IL(0)) and terminating in the second node (O(0)), when IL(0) is determined not to be an empty list. Accordingly, the dependence graph begins with either the set of nodes corresponding to the tasks of IL(0) (each having an outgoing edge that terminates in the node corresponding to the task of O(0)), or with the node corresponding to the task of O(0) (having no incoming edges. As each remaining IL(i) in the sequence is encountered at runtime, a similar method can be followed. For example, when each next IL(i) is encountered, nodes can be added to correspond to each of its tasks should any such tasks exist (i.e., if IL(i) is not an empty list), and incoming edges can be added to those nodes that originate from a node corresponding to O(i−1) (if O(i−1) exists). When each next O(i) is encountered, a respective node can be added to the dependence graph corresponding to the task of O(i). If any nodes corresponding to tasks of IL(i−1) exist, a respective edge can be added originating from each node corresponding to IL(i−1) and terminating in the respective node corresponding to the task of O(i). If there are no nodes corresponding to tasks of IL(i−1), but there is a node corresponding to the task of O(i−1), a respective edge can be added originating from the node corresponding to the task of O(i−1) and terminating in the respective node corresponding to the task of O(i).

Figure 7:
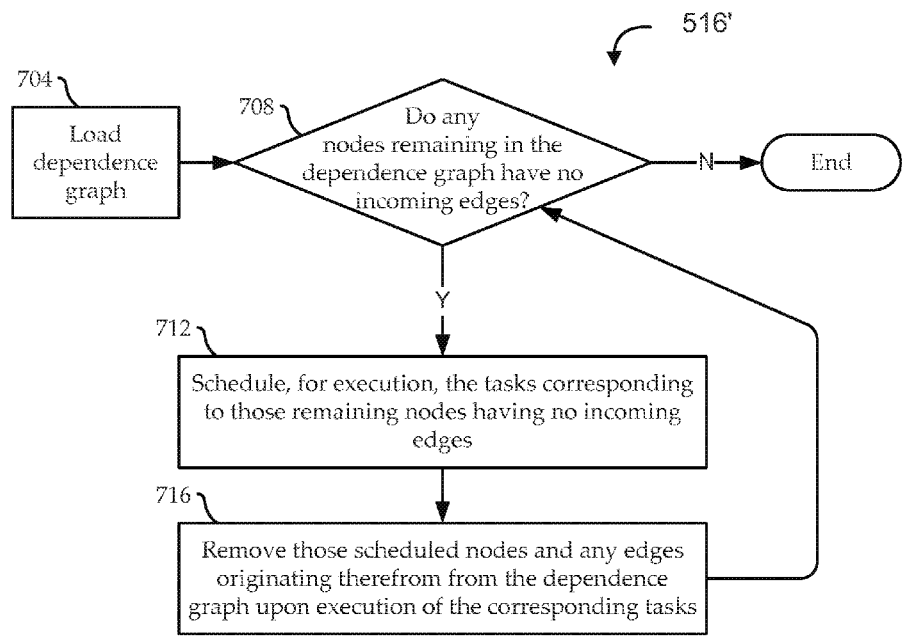
FIG. 7 shows a flow diagram of an illustrative method for scheduling tasks for execution by traversing the dependence graph.

For the sake of added clarity, FIG. 7 shows a flow diagram of an illustrative method 512' for scheduling tasks for execution by traversing the dependence graph, according to various embodiments. The method 512' can be an implementation of stage 512 of FIG. 5. The illustrative method 512' begins at stage 704 by loading the dependence graph. At stage 708, a determination is made as to whether any nodes remain in the dependence graph that have no incoming edges. This can indicate that those nodes have no remaining data dependencies that should impact scheduling of their corresponding tasks. The determination at stage 708 can cause the method 512' to effectively iterate until no nodes remain in the dependence graph.

At stage 712, the tasks corresponding to remaining nodes having no incoming edges can be scheduled for execution by the processor. For example, this can be a single node corresponding to a single task or a number of nodes corresponding to multiple tasks than can all be executed in parallel. Accordingly, in the event that multiple nodes are identified at stage 708 and scheduled at stage 712, some implementations can schedule those nodes in a manner that exploits multi-processing, for example, by assigning the corresponding tasks to multiple threads for concurrent execution. At stage 716, those scheduled nodes can be removed, along with any edges originating therefrom, from the dependence graph upon execution of the corresponding scheduled tasks. The can help avoid deadlock, loops, and/or other undesirable conditions in traversing the dependence graph. As described above, some implementations require that an operation (e.g., via a thread, etc.) obtains a lock or the like associated with a node before that node can be removed, which can help ensure thread-safe operation of the method 512'.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims. The various operations of methods and functions of certain system components described above can be performed by any suitable means capable of performing the corresponding functions.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A computational runtime environment comprising:
   a processor;
   a memory having compiled code stored thereon, the compiled code comprising a plurality of tasks compiled from corresponding task constructs of a source code, at least a subset of the tasks having associated tags that indicate data dependencies reflecting respective task dependencies of the source code; and
   a scheduler that operates to:
      generate a dependence graph dynamically at runtime according to the subset of tasks of the compiled code and their associated tags by:
         determining, as each task is encountered at runtime, whether the task has a respective data dependency according to its associated tags;
         adding a corresponding node to the dependence graph for the task when it is determined to have the respective data dependency; and
         adding a set of edges to the dependence graph that each terminate in the corresponding node in accordance with the respective data dependency; and
      schedule the subset of tasks for execution by the processor in a manner that preserves the task dependencies of the source code by traversing the dependence graph.

2. The computational runtime environment of claim 1, wherein adding the set of edges comprises:
   determining that the corresponding node depends from a set of other nodes according to the respective data dependency; and
   adding each of the set of edges to correspond to a respective one of the set of other nodes, so that each edge originates from the respective other node and terminates in the corresponding node.

3. The computational runtime environment of claim 1, wherein the scheduler operates to schedule the subset of tasks for execution by the processor by iteratively, until no nodes remain in the dependence graph, performing steps comprising:
   identifying a set of the remaining nodes of the dependence graph as having no incoming edges;
   scheduling the tasks corresponding to the identified set of the remaining nodes for execution by the processor; and
   removing the identified set of the remaining nodes and any edges originating therefrom from the dependence graph upon execution of the scheduled tasks.

4. The computational runtime environment of claim 3, wherein the scheduled tasks are sibling tasks each having an associated tag that points to a common location in the memory.

5. The computational runtime environment of claim 3, wherein scheduling the set of tasks corresponding to the identified set of the remaining nodes for execution by the processor comprises scheduling at least some of the set of tasks for parallel execution.

6. The computational runtime environment of claim 1, wherein the dependence graph is a direct acyclic graph.

7. The computational runtime environment of claim 1, wherein the scheduler further operates to:
   cause the processor to execute the subset of tasks according to the schedule.

8. The computational runtime environment of claim 1, wherein the memory comprises a plurality of memory locations, and each associated tag corresponds to a read/write operation that designates one of the memory locations.

9. The computational runtime environment of claim 8, wherein each associated tag is one of an "IN(x)" tag or an "OUT(x)" tag, the "IN(x)" tag corresponding to an operation that reads from one of the memory locations identified by "x," the "OUT(x)" tag corresponding to an operation that writes to the memory location identified by "x".

10. The computational runtime environment of claim 1, wherein the scheduler operates to generate the dependence graph dynamically at runtime according to a sequence: $IL(0); O(0); \ldots; IL(n); O(n)$, wherein:
   "$IL(i)$" represents an i-th list of tasks having associated tags corresponding to the operation that reads from the designated memory location of the memory, where i represents an integer between 0 and n; and "O(i)" represents an i-th task having an associated tag corresponding to an operation that writes to the designated memory location of the memory.

11. The computational runtime environment of claim 10, wherein the scheduler operates to generate the dependence graph dynamically at runtime by:
   determining, when IL(0) is encountered at runtime, whether IL(0) is an empty list;
   adding a first set of nodes to the dependence graph corresponding to each task of IL(0), when IL(0) is determined not to be an empty list;
   adding a second node to the dependence graph corresponding to the task of O(0) when O(0) is encountered at runtime;
   adding an edge originating from each of the first set of nodes and terminating in the second node, when IL(0) is determined not to be an empty list;
   for each remaining IL(i) in the sequence, as it is encountered at runtime:
   adding a respective node to the dependence graph corresponding to each task of IL(i), when IL(i) is not an empty list;
   determining whether there exists a node corresponding to O(i−1); and
   adding a respective edge originating from the node corresponding to O(i−1) and terminating in the respective node corresponding to each task of IL(i), when there exists a node corresponding to O(i−1); and
   for each remaining O(i) in the sequence, as it is encountered at runtime:
   adding a respective node to the dependence graph corresponding to the task of O(i);
   determining whether there exist any nodes corresponding to IL(i−1);
   adding a respective edge originating from each node corresponding to IL(i−1) and terminating in the respective node corresponding to the task of O(i), when there exist any nodes corresponding to IL(i−1); and
   adding a respective edge originating from the node corresponding to the task of O(i−1) and terminating in the respective node corresponding to the task of O(i), when there exists a node corresponding to O(i−1) and there do not exist any nodes corresponding to IL(i−1).

12. The computational runtime environment of claim 1, wherein the processor implements multi-threading, and the scheduler operates to schedule the subset of tasks further in a manner that exploits the multi-threading.

13. The computational runtime environment of claim 1, wherein the task constructs and task dependencies of the source code are defined according to an OpenMP programming specification.

14. A method for runtime handling of task dependencies, the method comprising:
   loading a compiled code from a data store, the compiled code comprising a plurality of tasks compiled from corresponding task constructs of a source code, at least a subset of the tasks having associated tags that indicate data dependencies reflecting respective task dependencies of the source code;
   generating a dependence graph dynamically at runtime according to the subset of tasks of the compiled code and their associated tags by:
      determining, as each task is encountered at runtime, whether the task has a respective data dependency according to its associated tags;
      adding a corresponding node to the dependence graph for the task when it is determined to have the respective data dependency; and
      adding a set of edges to the dependence graph that each terminate in the corresponding node in accordance with the respective data dependency; and
   scheduling the subset of tasks for execution by a processor in a manner that preserves the task dependencies of the source code by traversing the dependence graph.

15. The method of claim 14, wherein scheduling the subset of tasks for execution by the processor comprises performing iteratively, until no nodes remain in the dependence graph, steps comprising:
   identifying a set of the remaining nodes of the dependence graph as having no incoming edges;
   scheduling the tasks corresponding to the identified set of the remaining nodes for execution by the processor; and
   removing the identified set of the remaining nodes and any edges originating therefrom from the dependence graph upon execution of the scheduled tasks.

16. The method of claim 15, wherein scheduling the set of tasks corresponding to the identified set of the remaining nodes for execution by the processor comprises scheduling at least some of the set of tasks for parallel execution.

17. The method of claim 14, wherein the memory comprises a plurality of memory locations, and each associated tag corresponds to a read/write operation that designates one of the memory locations.

18. A non-transient, computer-readable storage medium in communication with a processor and having instructions stored thereon, which, when executed, cause the processor to perform steps comprising:
   loading a compiled code from a data store, the compiled code comprising a plurality of tasks compiled from corresponding task constructs of a source code, at least a subset of the tasks having associated tags that indicate data dependencies reflecting respective task dependencies of the source code;
   generating a dependence graph dynamically at runtime according to the subset of tasks of the compiled code and their associated tags by:
      determining, as each task is encountered at runtime, whether the task has a respective data dependency according to its associated tags;
      adding a corresponding node to the dependence graph for the task when it is determined to have the respective data dependency; and
      adding a set of edges to the dependence graph that each terminate in the corresponding node in accordance with the respective data dependency; and
   scheduling the subset of tasks for execution in a manner that preserves the task dependencies of the source code by traversing the dependence graph.

* * * * *

UNITED STATES PATENT AND TRADEMARK OFFICE
CERTIFICATE OF CORRECTION

PATENT NO. : 9,652,286 B2
APPLICATION NO. : 14/222273
DATED : May 16, 2017
INVENTOR(S) : Fan

It is certified that error appears in the above-identified patent and that said Letters Patent is hereby corrected as shown below:

On the Title Page

Column 2, under Attorney, Agent, or Firm, Lines 1-2, delete "Marsh Fischmann & Breyfole LLP;" and insert -- Marsh Fischmann & Breyfogle LLP; --, therefor.

In the Specification

In Column 5, Line 60, delete "specificaiton," and insert -- specification, --, therefor.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*